(12) United States Patent
Battistini (10) Patent No.: US 11,867,408 B2
(45) Date of Patent: Jan. 9, 2024

(54) OUTDOOR COOKING SYSTEM WITH IMPROVED HEAT AND FLAME CONTROL

(71) Applicant: Magma Products, Lakewood, CA (US)

(72) Inventor: Rikki Martin Battistini, Orange, CA (US)

(73) Assignee: Magma Products, Lakewood, CA (US)

( * ) Notice: Subject to any disclaimer, the term of this patent is extended or adjusted under 35 U.S.C. 154(b) by 35 days.

(21) Appl. No.: 17/685,140

(22) Filed: Mar. 2, 2022

(65) Prior Publication Data

US 2023/0280037 A1    Sep. 7, 2023

(51) Int. Cl.
| | |
|---|---|
| *F24C 3/08* | (2006.01) |
| *F23D 14/04* | (2006.01) |
| *A47J 37/07* | (2006.01) |
| *F23L 13/04* | (2006.01) |
| *F23N 3/00* | (2006.01) |

(52) U.S. Cl.
CPC .......... *F24C 3/085* (2013.01); *A47J 37/0713* (2013.01); *F23D 14/04* (2013.01); *F23L 13/04* (2013.01); *F23N 3/007* (2013.01)

(58) Field of Classification Search
CPC ....... F24C 3/085; A47J 37/0713; F23D 14/04; F23L 13/04; F23N 3/007
USPC ................ 126/39 E, 39 R, 25 R, 29, 25 B
See application file for complete search history.

(56) References Cited

U.S. PATENT DOCUMENTS

| | | | | |
|---|---|---|---|---|
| 2,539,101 | A * | 1/1951 | Reeves | ................ F23D 14/065 239/565 |
| 6,422,231 | B1 * | 7/2002 | Hamilton | ................ F24C 3/067 126/41 R |
| 6,688,882 | B1 * | 2/2004 | Williams | ................ F23C 7/008 431/351 |
| 7,237,547 | B1 * | 7/2007 | Bourgeois | ............... A47J 36/26 126/50 |

* cited by examiner

*Primary Examiner* — Vivek K Shirsat
(74) *Attorney, Agent, or Firm* — Raymond Sun (57) ABSTRACT

A firebox for an outdoor cooking system has a gas burner positioned inside the firebox housing. The gas burner has a built-in altitude adjustment mechanism that allows for adjustment of proper air/gas mixture for cooking at different altitudes. An air deflector configured as an enclosing wall encloses the gas burner so as to greatly reduce the flow of unwanted air/wind disruptions to the flame/heat output of the gas burner.

7 Claims, 8 Drawing Sheets

OUTDOOR COOKING SYSTEM WITH IMPROVED HEAT AND FLAME CONTROL

BACKGROUND OF THE INVENTION

1. Field of the Invention

The present invention relates to an outdoor cooking system, and in particular, to an outdoor cooking system that provides (i) an altitude adjuster that allows for adjustment of the air supply to the gas burner for cooking at higher altitudes, and (ii) a mechanism that distributes undisrupted flame/heat to the cooking surface while allowing the gas burner's Venturi primary air openings to be fully exposed to the air supply for sufficient air/gas mixture to the gas burner.

2. Description of the Prior Art

Outdoor cooking systems are becoming more sophisticated to provide grillers with improved grilling and cooking experiences. Given the nature of a cooking system in terms of where it is used (usually outdoors), and how it is used, the surrounding environment significantly impacts the performance of the cooking system.

One important factor is the altitude. Outdoor cooking at higher altitudes is different from outdoor cooking at sea level because the atmosphere becomes drier while the air has less oxygen and less atmospheric pressure, so cooking takes longer at higher elevations. As altitude increases with less oxygen and the atmospheric pressure decreases, the boiling point of water decreases. To compensate for the lower boiling point of water, the cooking times must be increased. Turning up the heat will not help cook food faster because no matter how high the cooking temperature the system is still being starved of oxygen at altitude. Even if the heat is turned up, the fluids will simply evaporate faster and whatever is being cooked will dry out faster. Therefore, air supply intake adjustments need to be made in order to provide a cooking experience at higher altitudes that is similar to that at sea level.

Conventional outdoor cooking systems require some form of dis-assembly to make these air intake adjustments when cooking at higher altitudes with the same requirements to be performed when returning to cooking at sea level. This can be inconvenient and undesirable.

Another important factor is external wind drafts. Any excessive wind or airflow around the gas burner can potentially disrupt the gas burner's flame and heat output. Conventional cooking systems employ air deflectors that are placed externally as opposed to being built internally. These external deflectors do not aid in containing the heat from being distributed to the rest of the unit's firebox, but simply deflects the wind from potentially entering the unit which could also potentially restrict the air flow going to the unit's burner Venturi primary air openings.

Thus, there remains a need for a cooking system that addresses these two important factors to provide a better and improved cooking experience.

SUMMARY OF THE DISCLOSURE

It is an object of the present invention to provide a cooking system that provides improved heat and flame control for use in all altitudes.

In order to accomplish the objects of the present invention, there is provided a firebox for an outdoor cooking system. The firebox has a gas burner positioned inside the firebox housing. The gas burner has a plurality of gas ports distributed along a surrounding edge, with a burner Venturi tube extending from the gas burner and terminating at a generally cylindrical mouth that has a plurality of air openings. A Venturi cover is also positioned inside the firebox housing and has a plurality of openings that are aligned with corresponding ones of the plurality of air openings of the burner Venturi tube. A gas valve has a fuel output fitting orifice that extends from the gas valve through the Venturi cover to be rotatably coupled to the cylindrical mouth of the gas burner. An adjustment mechanism is coupled to the Venturi cover, and allows a user to rotate the Venturi cover with respect to the cylindrical mouth so as to adjust the positions of the plurality of openings of the Venturi cover with respect to the positions of the plurality of air openings of the burner Venturi tube, so as to provide adjustment of proper air/gas mixture.

Thus, the present invention provides a built-in altitude adjuster that has been designed to allow a manual adjustment of the air supply to the unit's gas burner for cooking at higher altitudes. The altitude adjuster lever in conjunction with the Venturi cover with primary air opening perform to increase or decrease the amount of air intake into the gas burner's Venturi primary air supply to the gas burner. The simply designed Venturi cover with primary air openings goes over the burner's Venturi tube with Venturi primary air openings to allow these manual adjustments from sea level to higher altitude use without the need to dismantle the unit to make these adjustments. Thus, the present invention replaces the need for dis-assembly of the existing cooking system.

In addition, the present invention provides a simple and effective 360° air deflector that is built internally into the fireboxes to prevent excessive air flow across and around the gas burner on all sides. The air deflector has an enclosing wall to contain the gas burner so it only distributes undisrupted flame/heat to the unit's cooking surface while allowing the burner's Venturi primary air openings to be fully exposed to the air supply for sufficient air/gas mixture to the gas burner. With a built-in deflector there is no additional assembly or disassembly for use as well as additional items to be purchased or stored, while assisting with a much more efficient air supply to the gas burners Venturi primary air openings.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
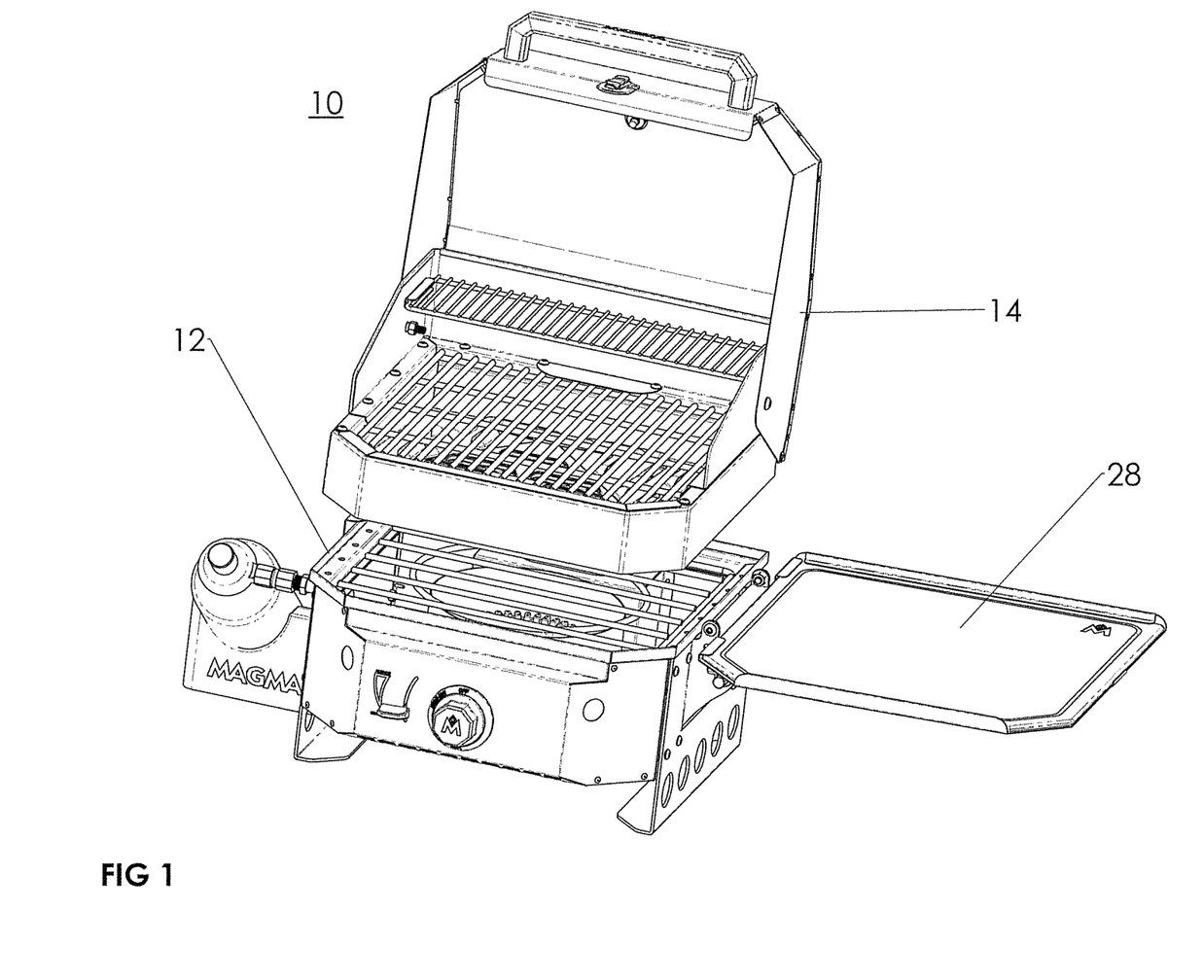
FIG. 1 is an exploded perspective view of the cooking system according to one embodiment of the present invention.

FIG. 1 illustrates a cooking system 10 that can include the firebox 12 of the present invention. The cooking system 10 is similar to any conventional cooking system and has a grill box 14 disposed over a firebox 12. The firebox 12 can be secured over any moveable or fixed support. The present disclosure will focus only on the firebox 12 as the grill box 14 can be the same as any conventional grill box.

Figure 2:
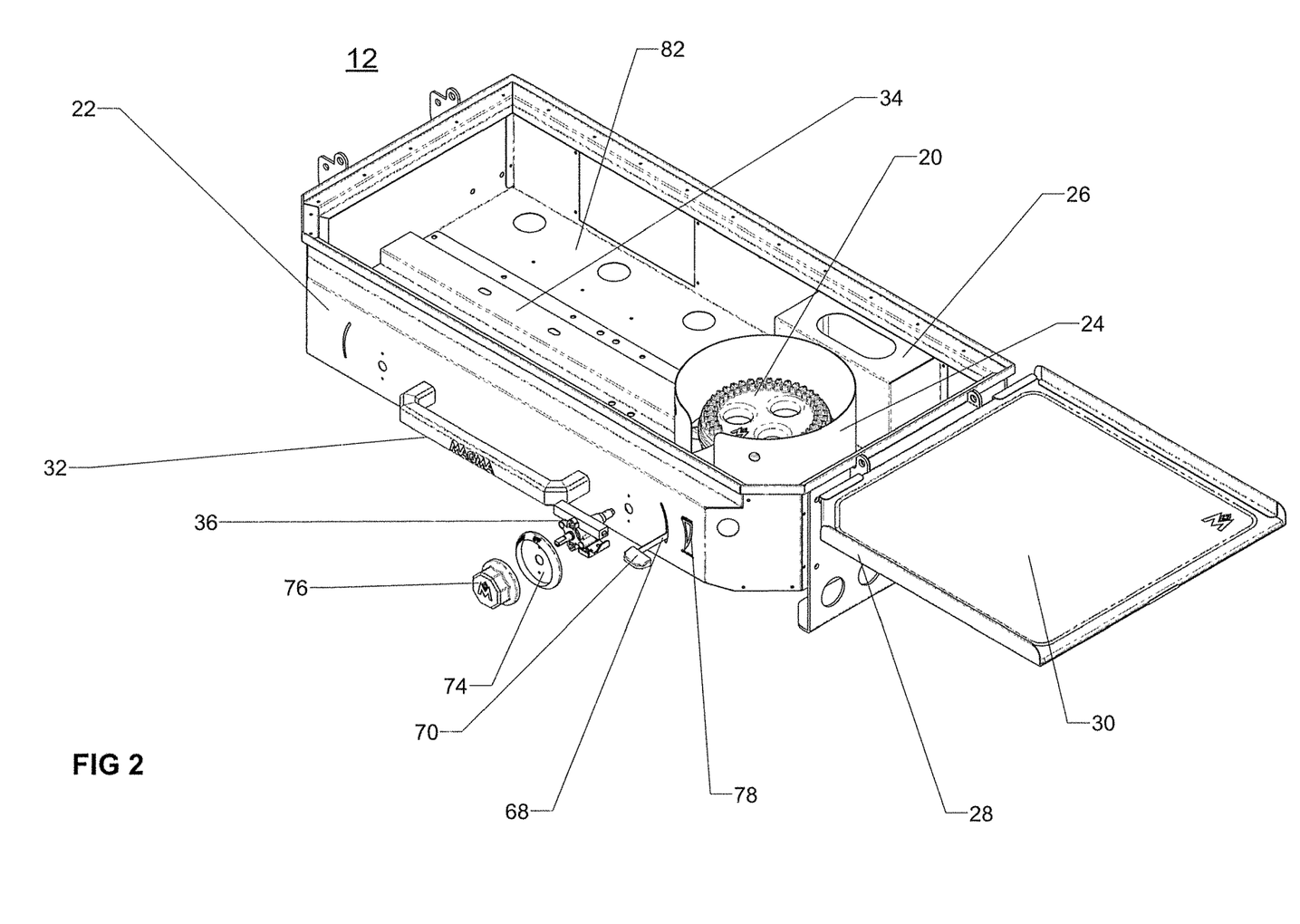
FIG. 2 is a perspective view of the firebox of the system of FIG. 1.

Referring now to FIG. 2, the firebox 12 houses the gas burner 20 inside a firebox housing 22 that can be the same as any conventional firebox housing. The firebox housing 22 has an interior space which houses the gas burner 20. This gas burner 20 incorporates the inclusion of the altitude adjuster system which conventional gas burners do not include, and is surrounded by a generally circular wall 24 which functions as an air deflector. As with conventional fireboxes, a grease storage container 26 can be positioned behind the gas burner 20 to collect grease that drips from the grill box 14 and all additional topper accessories. A fold-out side table 28 is connected to the side of the firebox housing 22 where the gas burner 20 is located, and functions as an internal component securing lid. When the side table 28 is folded out as shown in FIG. 2, the inner surface 30 can be used as a cutting table surface. A carrying handle 32 is provided along the longitudinal wall of the firebox housing 22. A cross-member 34 extends inside the firebox housing 22 for securing the gas burner 20 with the air deflector 24, and provides increased rigidity when the firebox 12 is mounted to prevent unnecessary flex in the firebox 12.

Referring also to FIGS. 3-6, the gas burner 20 includes an altitude adjuster system that is built into the gas burner 20. The gas burner 20 has gas ports 42 distributed in spaced-apart manner along its circumferential edge. A burner Venturi tube 44 extends from the gas burner 20 and terminates at a generally cylindrical mouth 46 that has air openings 48 provided along its cylindrical wall, and other air openings 50 provided at its front face 52. Two symmetrical air openings 50 are provided on the front face 52 and they oppose each other about the center of the front face 52. Each air opening 50 has an arcuate shape that resembles a piece of a pie that has been sliced from the central point of the circle that defines the front face 52. Specifically, the arcuate shape has two diagonal lines that meet at the central point of the circle, and are connected at the opposite ends by a curved edge.

The complete gas burner 20 assembly includes a gas valve assembly and a Venturi cover 58. The gas valve assembly has a gas valve 56 can be any conventional gas valve with a fuel output fitting orifice 60 (see FIG. 5) that extends from a first end through a central bore or hole of the Venturi cover 58 to be rotatably coupled to the front face 52 of the cylindrical mouth 46 of the gas burner 20. The Venturi cover 58 has air openings 62 provided along its cylindrical wall, and other air openings 64 provided at its front face 66. Each air opening 64 also has an arcuate shape similar to the arcuate shape of the air openings 50 for the gas burner 20.

The Venturi cover 58 includes an L-shaped altitude adjustment lever 68 which extends from the front face 66 and terminates at a handle 70 that is adapted for use by a user to raise and lower the lever 68.

A bezel 74 secures the opposite second end of the gas valve 56 to the firebox housing 22, and a knob 76 is secured to the gas valve 56. The user will operate the knob 76 to ignite and control the gas burner 20 during the cooking operation. Finally, a label 78 is provided along the front face of the firebox housing 22 where the altitude adjustment lever 68 and handle 70 extend through the fire box housing 22 to show the user the varying altitude levels that can be adjusted.

Figure 3:
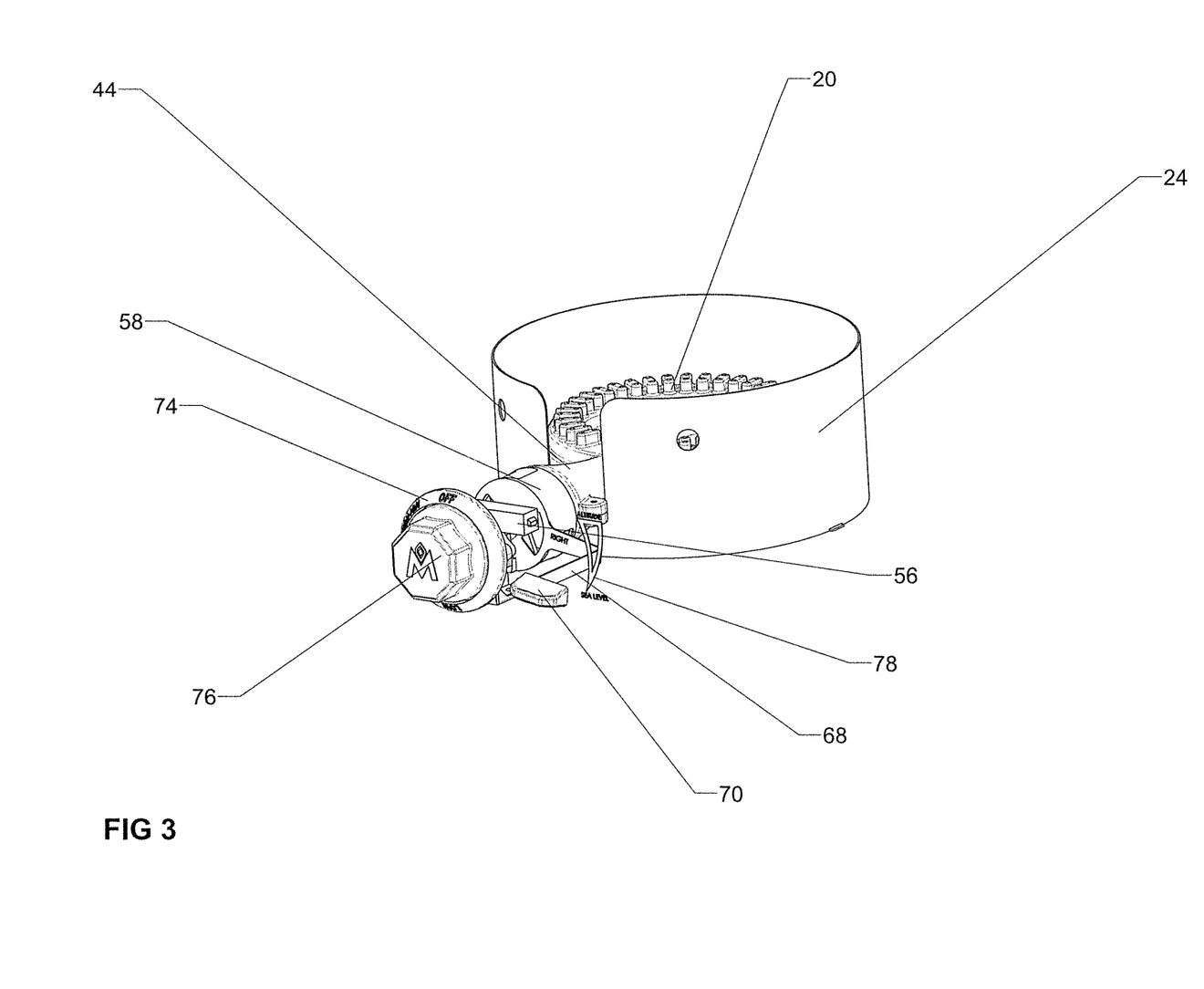
FIG. 3 is a perspective view of the gas burner and air deflector for the firebox of FIG. 2 shown with the gas burner positioned for use at sea level.
Figure 4:
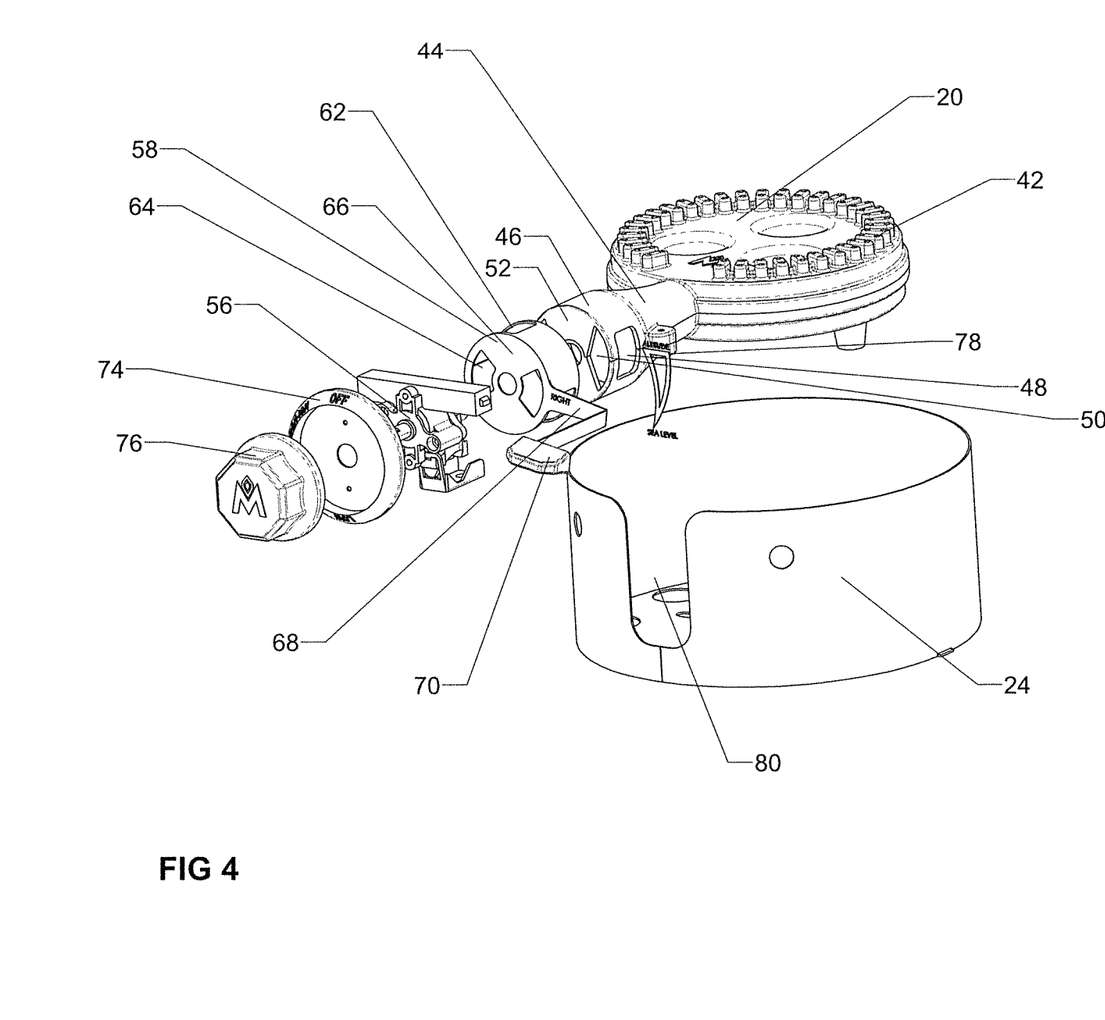
FIG. 4 is an exploded perspective view of the gas burner and air deflector of FIG. 3.
Figure 5:
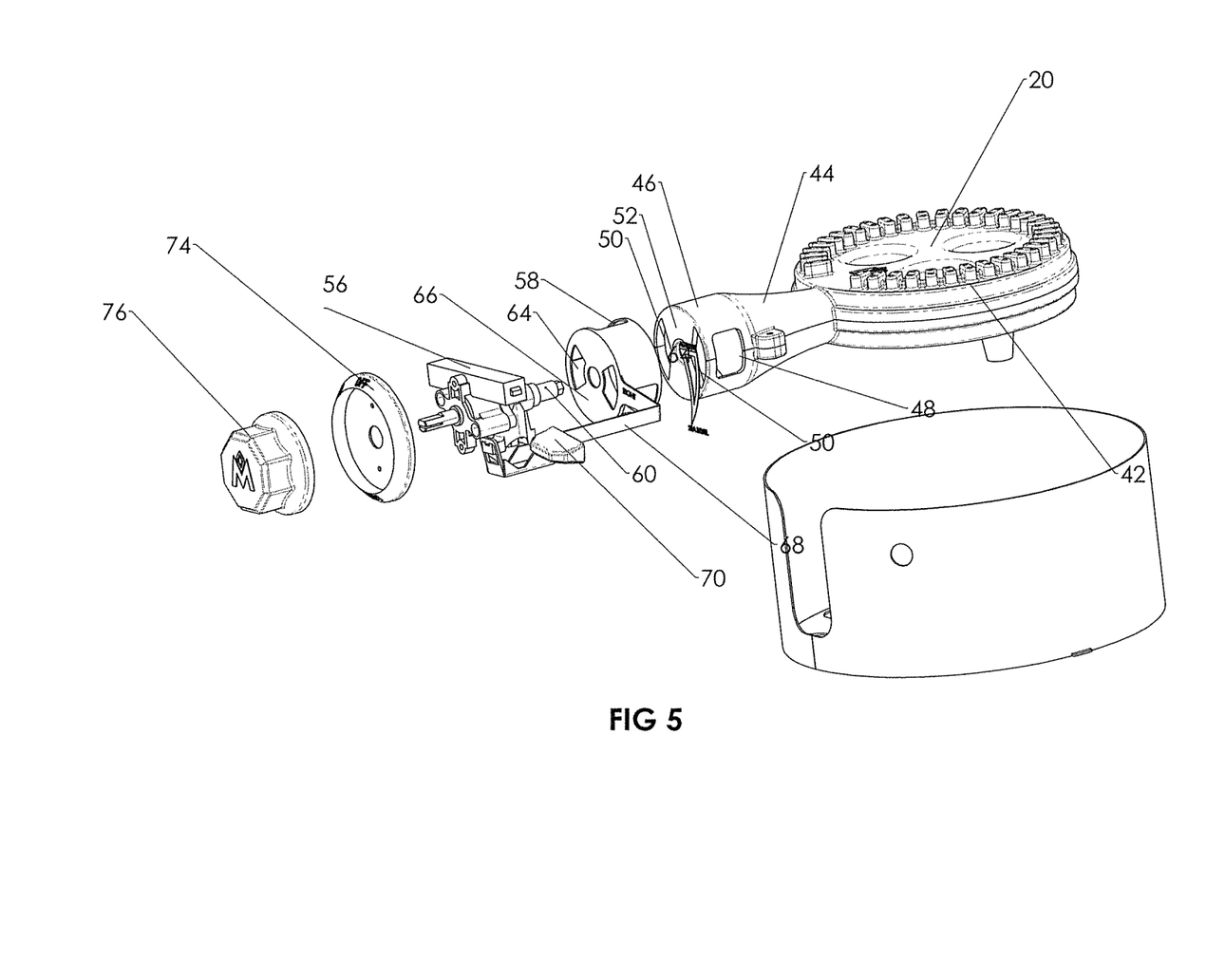
FIG. 5 is another exploded perspective view of the gas burner of FIG. 3.
Figure 6:
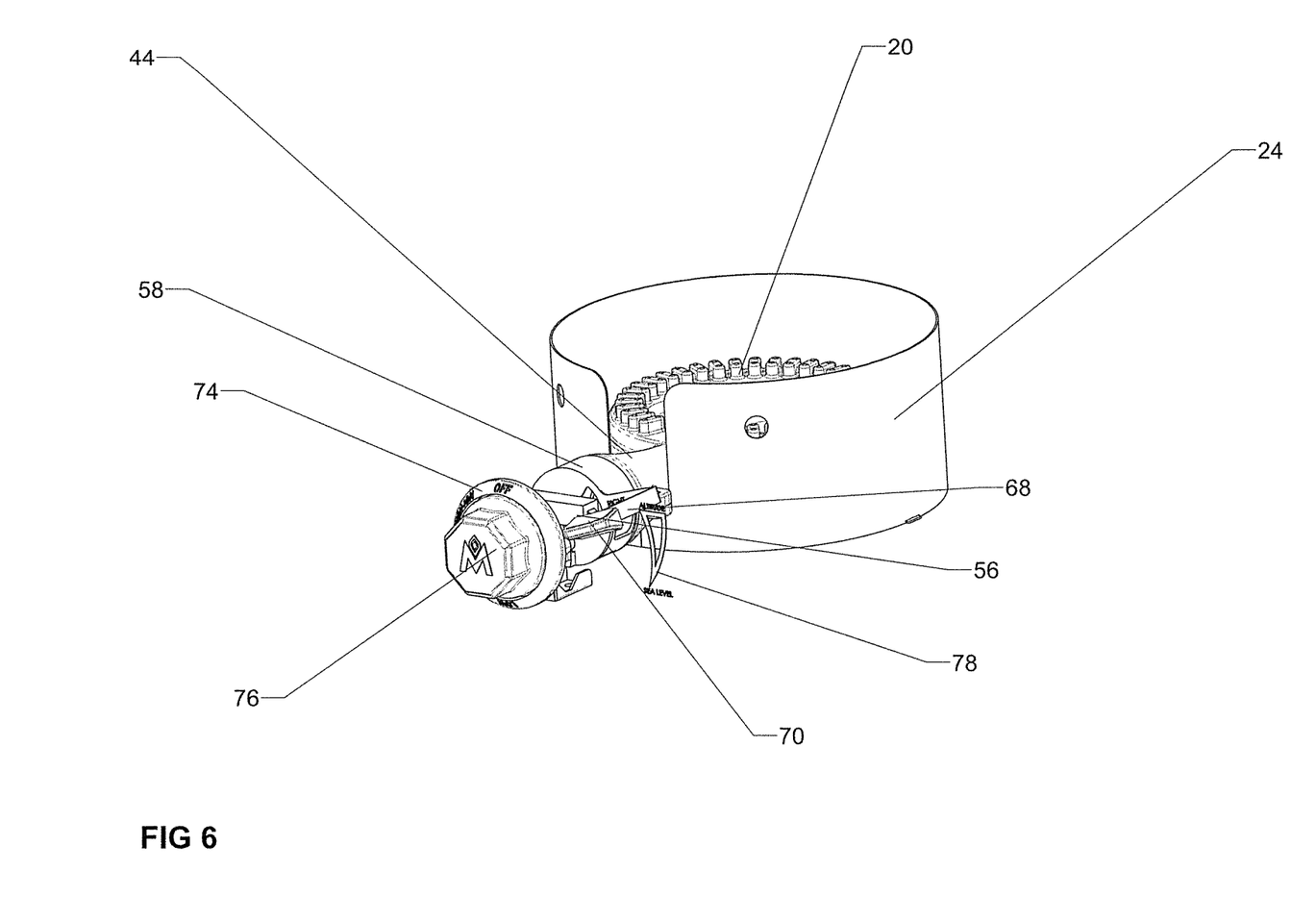
FIG. 6 is a perspective view of the gas burner and air deflector for the firebox of FIG. 2 shown with the gas burner positioned for use at altitude.
Figure 7:
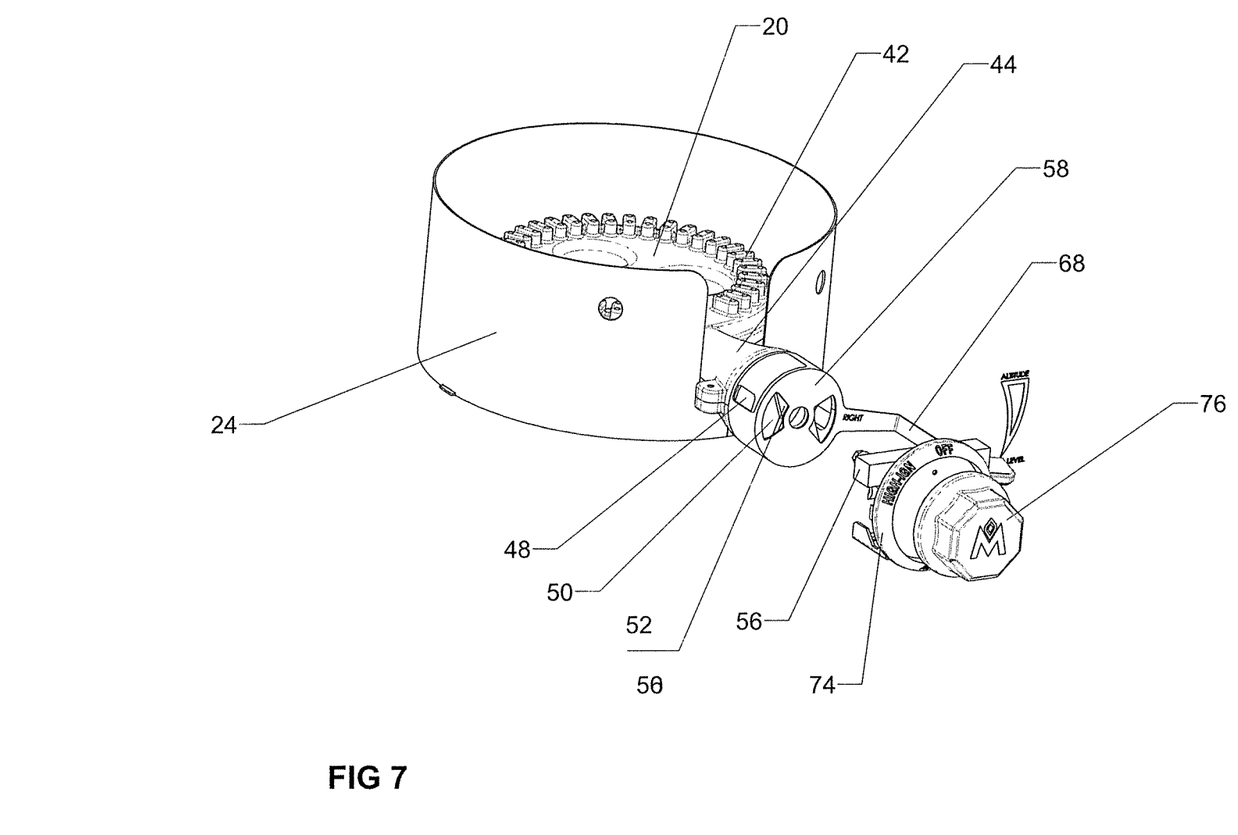
FIG. 7 is another perspective view of the gas burner and air deflector for the firebox of FIG. 2 shown with the gas burner positioned for use at sea level.
Figure 8:
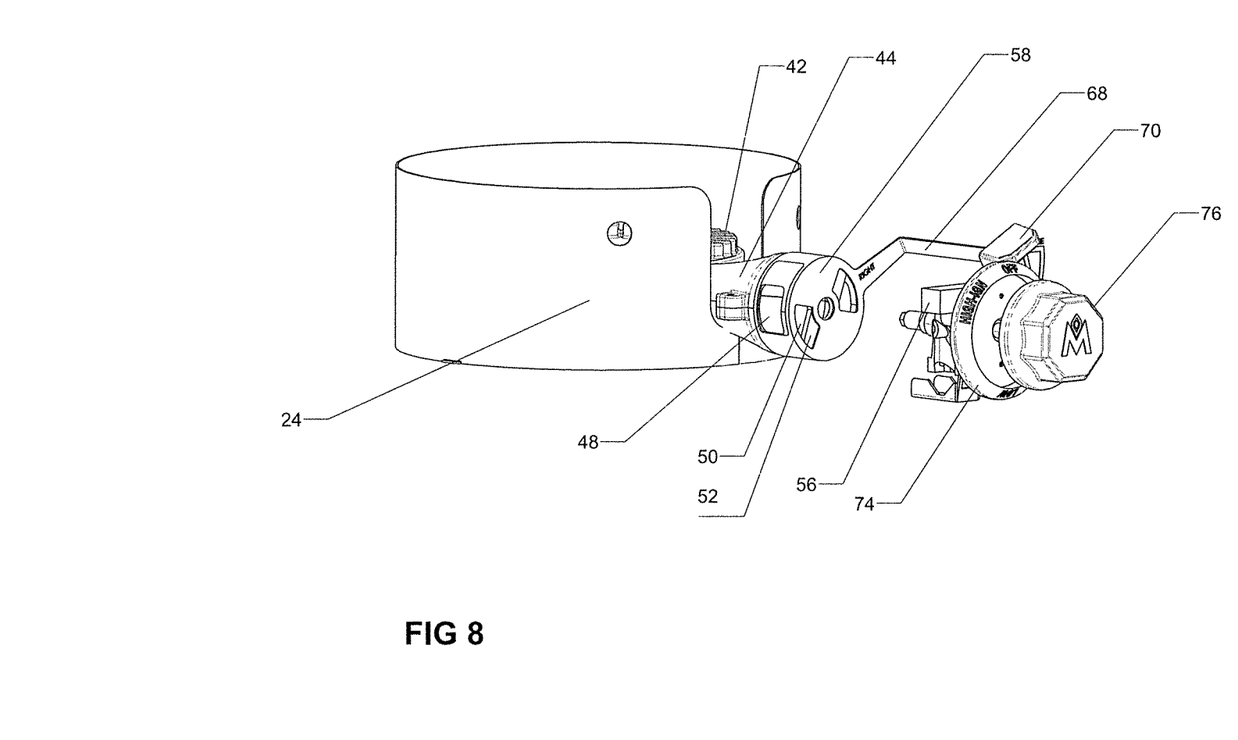
FIG. 8 is another perspective view of the gas burner and air deflector for the firebox of FIG. 2 shown with the gas burner positioned for use at altitude.

Referring to FIGS. 3, 6, 7, and 8, when operating the altitude adjustment lever 68, FIGS. 3 and 7 show the altitude adjustment lever 68 positioned for use in a sea level application with air openings 62/64 of the Venturi cover 58 and air openings 48/50 of the burner Venturi tube 44 partially restricted by the Venturi cover 58 for proper air/gas mixture at lower elevations. FIGS. 6 and 8 show the altitude adjustment lever 68 positioned for use in a higher altitude application with air openings 62/64 of the Venturi cover 58 and air openings 48/50 of the burner Venturi tube 44 unrestricted by the Venturi cover 58 for maximum air/gas mixture at higher elevations. In other words, the air openings 62/64 of the Venturi cover 58 operate to partially cover or restrict the air openings 48/50 of the burner Venturi tube 44 to allow for adjustment of proper air/gas mixture.

The built-in air deflector 24 has an enclosing wall that is adapted to receive the gas burner 20 inside. The enclosing wall can be a circular wall of the air deflector 24, and has a forward-facing slot 80 through which the burner Venturi tube 44 extends to the outside of the air deflector 24, such that the burner Venturi tube 44 and mouth 46 are outside the circular wall of the air deflector 24. The air deflector 24 and the gas burner 20 are secured together, and then secured to the cross-member 34 of the firebox housing 22 using conventional techniques that are well-known in the art.

The enclosing wall of the built-in air deflector 24 has been designed to provide a protective shield that surrounds and extends upwardly above the gas burner 20 to just below the cooking surface of the firebox 12 so as to greatly reduce the flow of unwanted air/wind disruptions to the flame/heat output of the gas burner 20. Specifically, the height of the circular wall needs to be upwardly above the gas burner 20 to just below the cooking surface of the firebox 12, preferably about half an inch below the cooking surface. In addition, to be most effective, all surfaces of the enclosing wall of the air deflector 24 is preferably no more than 1.5 inches away from the outer edge of the gas burner 20.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A firebox for an outdoor cooking system, comprising a firebox housing, the firebox further comprising:
   gas burner positioned inside the firebox housing, the gas burner having a surrounding edge and a plurality of gas ports distributed along the surrounding edge, with a burner Venturi tube extending from the gas burner and terminating at a generally cylindrical mouth that has a plurality of air openings;

a Venturi cover having a plurality of openings that are aligned with corresponding ones of the plurality of openings of the burner Venturi tube;

a gas valve having a fuel output fitting orifice that extends from the gas valve through the Venturi cover to be rotatably coupled to the cylindrical mouth of the Venturi cover an adjustment mechanism that is coupled to the Venturi cover, the adjustment mechanism allowing a user to rotate the Venturi cover with respect to the cylindrical mouth so as to adjust the positions of the plurality of openings of the Venturi cover with respect to the positions of the plurality of air openings of the burner Venturi tube;

wherein the firebox defines a cooking surface, and further includes an enclosing wall defining an interior space, with the gas burner positioned inside the interior space and enclosed by the enclosing wall, wherein the enclosing wall has a height which extends upwardly above the gas burner to below the cooking surface of the firebox; and wherein the gas burner has an outer edge, and all surfaces of the enclosing wall are spaced from the outer edge by no more than 1.5 inches.

2. The firebox of claim 1, wherein the adjustment mechanism comprises a lever which extends from the Venturi cover and terminates at a handle.

3. The firebox of claim 1, wherein the cylindrical mouth has a cylindrical wall and a front face, with at least one of the plurality of air openings provided along the cylindrical wall, and at least one of the plurality of air openings provided at the front face.

4. The firebox of claim 3, wherein the at least one of the plurality of air openings provided at the front face comprises two symmetrical air openings that oppose each other about the center of the front face.

5. The firebox of claim 4, wherein each of the two symmetrical air openings are arcuate.

6. The firebox of claim 3, wherein the Venturi cover has a cylindrical wall and a front face, with at least one of the plurality of openings provided along the cylindrical wall of the Venturi cover, and at least one of the plurality of air openings provided at the front face of the Venturi cover.

7. The firebox of claim 6, wherein each of at least one of the plurality of air openings provided at the front face of the Venturi cover are arcuate.

* * * * *